United States Patent
Isoguchi et al.

(10) Patent No.: US 6,888,642 B1
(45) Date of Patent: May 3, 2005

(54) PHOTOGRAPHIC PRINT PRODUCING SYSTEM BASED ON PREFERENCE OF A CUSTOMER

(75) Inventors: Seiichi Isoguchi, Hachioji (JP); Katsutoshi Sawada, Hino (JP); Chie Nemoto, Hachioji (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/450,412

(22) Filed: Nov. 29, 1999

(30) Foreign Application Priority Data

Nov. 30, 1998 (JP) ............................................ 10/339483

(51) Int. Cl.$^7$ ........................... G06K 15/02; G06F 3/12; G06F 13/00
(52) U.S. Cl. ....................... 358/1.15; 358/1.14; 358/1.9
(58) Field of Search ............................... 358/1.15, 1.14, 358/1.9, 1.2, 1.4, 1.6, 1.13, 1.18, 2.1, 501, 401, 537, 403, 426.02, 426.06, 437, 462, 488, 1.16, 504, 518, 532; 710/17–19, 46; 382/305, 306, 274, 254

(56) References Cited

U.S. PATENT DOCUMENTS

| | | | | |
|---|---|---|---|---|
| 5,889,896 A | * | 3/1999 | Meshinsky et al. | 382/305 |
| 5,982,999 A | * | 11/1999 | Aoyagi et al. | 395/117 |
| 6,041,265 A | * | 3/2000 | Suzuki et al. | 700/84 |
| 6,393,164 B2 | * | 5/2002 | Shimizu et al. | 382/325 |
| 6,504,960 B2 | * | 1/2003 | Takahashi | 382/305 |
| 6,623,528 B1 | * | 9/2003 | Squilla et al. | 715/523 |

* cited by examiner

*Primary Examiner*—Douglas Tran
(74) *Attorney, Agent, or Firm*—Cantor Colburn LLP

(57) ABSTRACT

A print producing system to produce a print based on image data and print producing information which are transmitted, comprises a memory to store relevant information regarding the image data and the print producing information together with identification information; a controller to read the relevant information corresponding to the identification information from the memory when the image data and the print producing information are transmitted together with the identification information; and a printer to produce a print based on the image data and the print producing information by utilizing the relevant information read by the controller.

7 Claims, 4 Drawing Sheets

PHOTOGRAPHIC PRINT PRODUCING SYSTEM BASED ON PREFERENCE OF A CUSTOMER

BACKGROUND OF THE INVENTION

This invention relates to a photographic print producing system, and in particular, to a photographic print producing system having a mode in which a photographic print is made by utilizing relevant information.

Incidentally, the words "a print" are often used herein instead of the words "a photographic print" for simplicity's sake.

It has been practiced in recent years that digital image information obtained by photographing with a digital camera is printed by a color printer. Further, it has been proposed a service such that processing using an expensive apparatus and preparing a high-quality photographic print by printing on the basis of this digital image information.

Furthermore, in view of the time required for preparing the ordered matter at a shop front and the situation of disorder produced, it has been proposed that the digital image information photographed is inputted in a computer etc. and processed to prepare print producing information beforehand, and this print producing information is transferred to a recording medium which is capable of engaging and disengaging (a PC card, and various kinds of memory cards) to be used for the reception of printing.

However, in respect of photographic prints prepared in this way, all of them are printed uniformly, and printing in accordance with the preference of the customer (preference for hue, for example, a bluish color, brightness, chroma, the sharpness of image, and the hardness of image, etc.) has not been put into practice.

SUMMARY OF THE INVENTION

This invention has been done in view of the above-mentioned subject, and it is an object of the invention to provide a photographic print producing system capable of carrying out printing in accordance with the preference of the customer.

The above-described problem can be solved by the following structures:

(1) A print producing system to produce a print based on image data and print producing information which are transmitted, comprising:

a memory to store relevant information regarding the image data and the print producing information together with identification information;

a controller to read the relevant information corresponding to the identification information from the memory when the image data and the print producing information are transmitted together with the identification information; and a printer to produce a print based on the image data and the print producing information by utilizing the relevant information read by the controller.

(2) A print producing system, comprising:

an input device to input image data and identification information;

a memory to correlate the identification information with relevant information regarding the image data and to store the identification information and the relevant information both correlated with each other;

a controller to read based on the identification information inputted by the input device the relevant information which is correlated with the identification information and stored in the memory; and a printer to produce a print based on the image data by utilizing the relevant information read by the controller.

(3) A print producing system, comprising:

a memory to correlate identification information with relevant information regarding image data and to store the identification information and the relevant information both correlated with each other;

an input, device to input print producing information;

a controller to read the relevant information from the memory based on identification information when the input device inputs the identification information; and a printer to produce a print based on the image data and the print producing information by utilizing the relevant information read by the controller.

Further, the above-described problem may be solved by the following preferable structure:

(4) A photographic print producing system which produces a photographic print on the basis of image data and print producing information transmitted to it, comprising memory means for memorizing information relating to said image data and to said print producing information and a mode in which printing is done utilizing said relevant information memorized in said memory means in producing a photographic print on the basis of said image data and said print producing information.

According to this structure of the invention, printing can be done utilizing the aforesaid relevant information in producing a photographic print on the basis of image data and print producing information.

The print producing information means herein print designating information for setting an image to be printed, print size information for setting a print size, print quantity information for setting the number of prints, and print finishing information relating to the finishing of a print, etc.

Further, the relevant information means information such as preference of the customer (for example, preference for a bluish color etc.), hue, chroma, brightness, and sharpness.

(5) A photographic print producing system set forth in the paragraph (4), wherein the aforesaid relevant information is memorized in a memory means together with a identification information, and in the aforesaid mode, when the aforesaid image data and print producing information to be transmitted to the system are transmitted together with the identification information, said relevant information which is corresponding to said identification information and is memorized together with it is read out and utilized.

According to this structure of the invention, the relevant information which has been memorized together with the identification information corresponding to the identification information transmitted to the system can be read out and utilized.

DETAILED DESCRIPTION OF THE PREFERRED EMBODIMENT

In the following, an example of the embodiment of this invention will be explained in detail with reference to the drawings. Incidentally, in this example of the embodiment, an order may be done directly by using a digital camera, for example, as an ordering apparatus, done indirectly through an apparatus connected to a network, or done after once transmitting the image data to another apparatus such as a computer.

Figure 1:
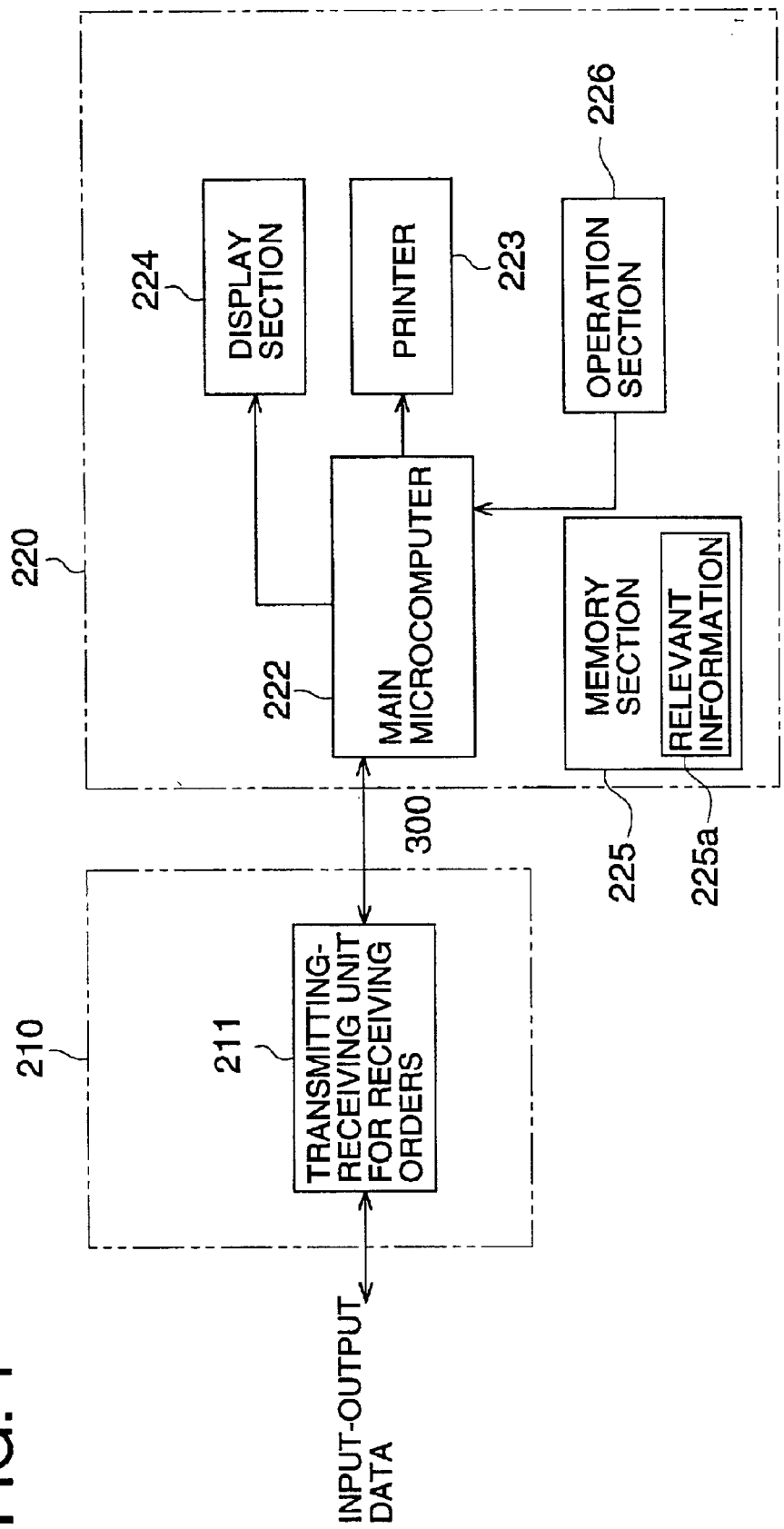
FIG. 1 is a block diagram showing an example of the embodiment of this invention.
Figure 2:
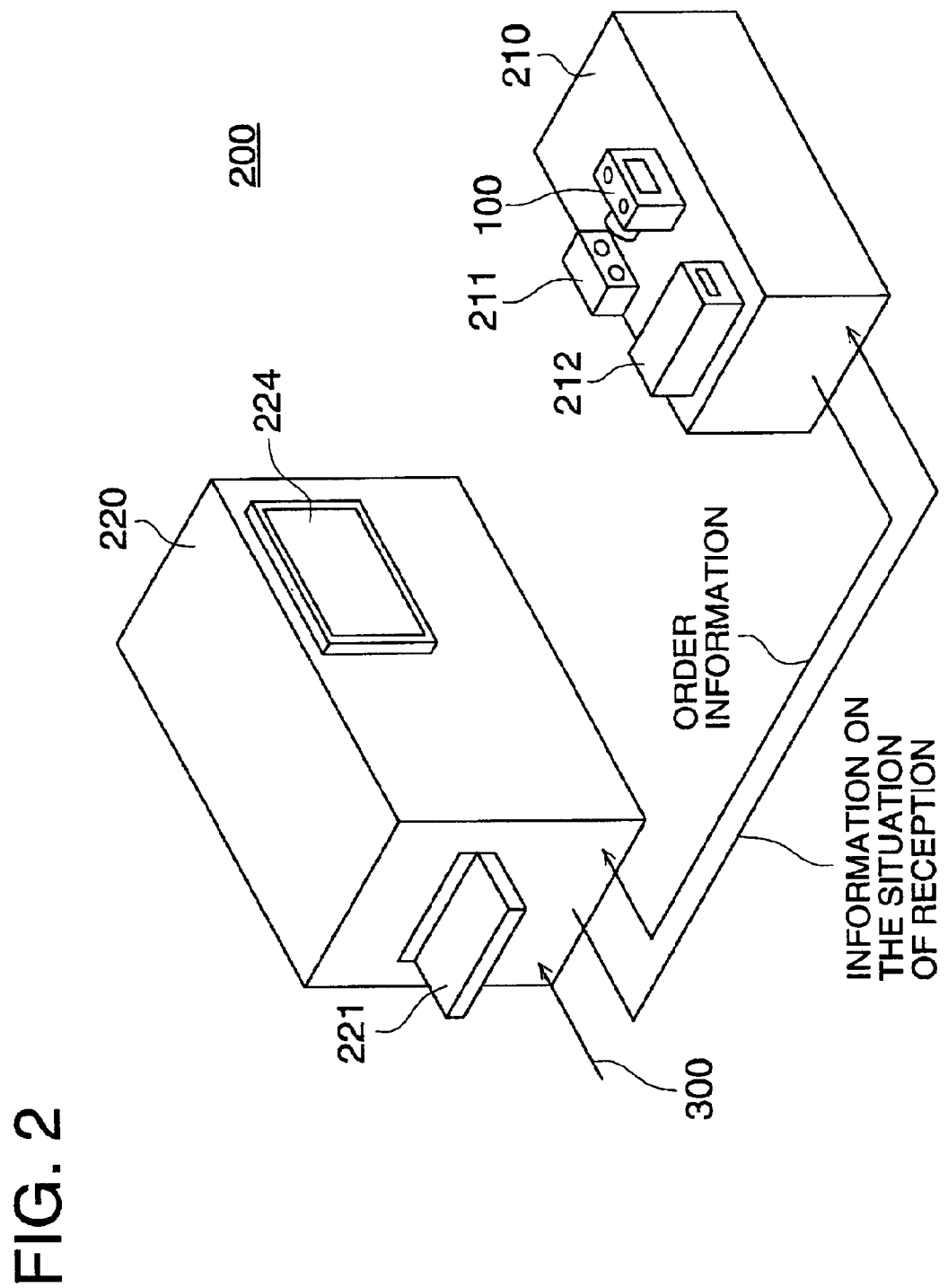
FIG. 2 is a drawing showing the structure how data are transmitted and received between a digital camera and a print producing system.

FIG. 1 is a block diagram showing an example of the embodiment of a photographic print producing apparatus of this invention, and FIG. 2 is a drawing showing an example of the appearance structure of this invention, and shows the transmitting and receiving of data between a digital camera and a print producing system. This print producing system 200 is composed of the order counter 210 for receiving an order from a user and the printing apparatus 220 for printing out digital image information in accordance with the order. However, this invention should not be limited to this example of the embodiment.

In this example, the order counter 210 performs a role as a table for putting a digital camera 100 on it, and the transmitting-and-receiving unit 211 for receiving an order is placed at the position opposite to the transmitting-and-receiving unit 10 (to be described later) of the digital camera 100. Further, the transmitting-and-receiving units 10 and 211 carry out the transmitting and receiving of data between themselves using light or electromagnetic wave.

The printing apparatus 220 carries out printing in accordance with print producing information, and is equipped with the print outlet 221 for outputting a print to the outside. Further, the main microcomputer 222 for controlling the whole apparatus is provided, and under the control of this main microcomputer 222, the printer 223 for outputting a print and the display section 224 for displaying a message relating to the information concerning the situation of reception are provided. 225 is the memory section for memorizing the information relating to this invention, for example, the print producing information, image data, and the relevant information. 225a shows the relevant information. This relevant information is inputted from the operation section 226 such as a keyboard connected to the main microcomputer 222.

Figure 3:
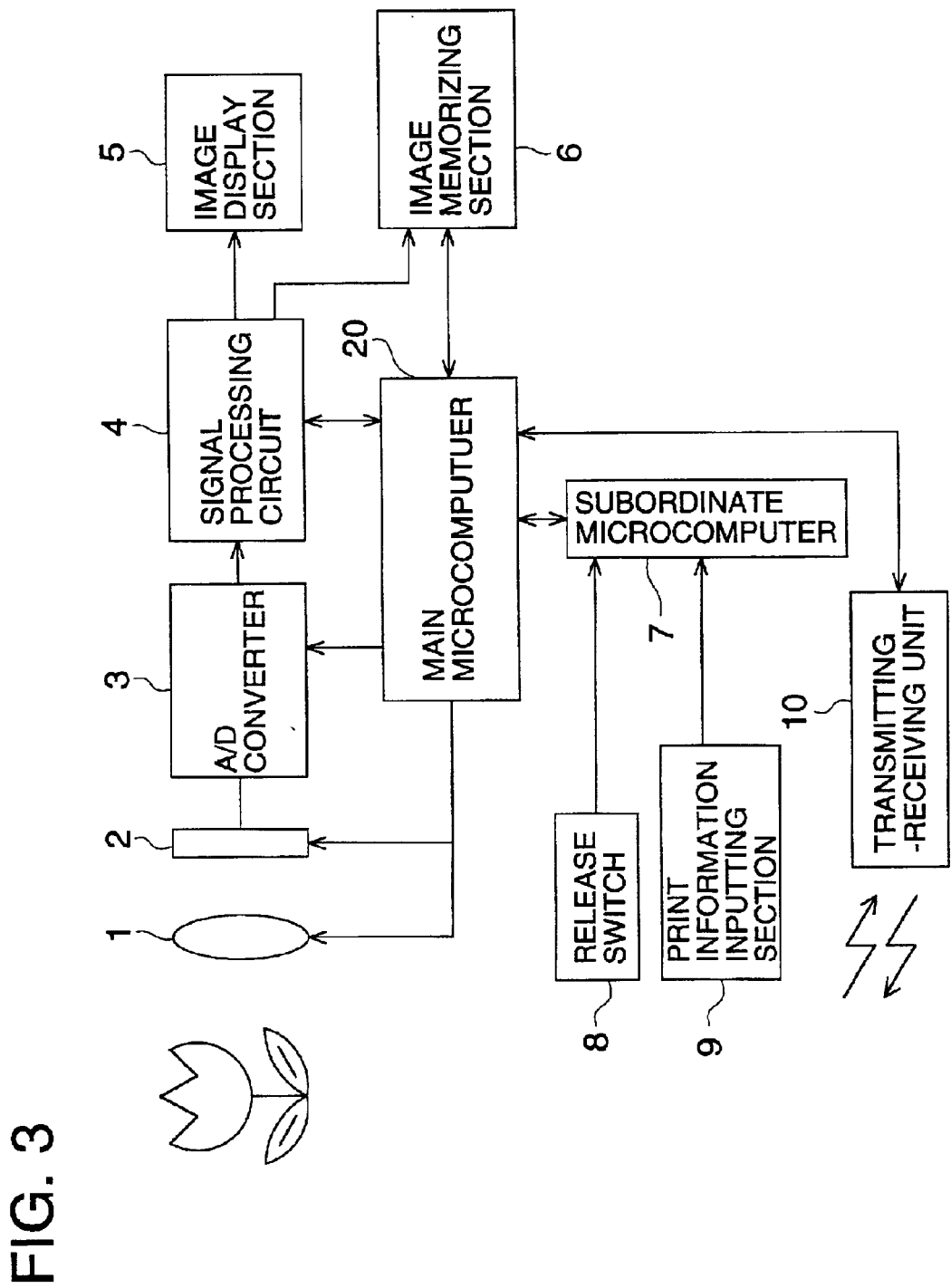
FIG. 3 is a conceptional drawing of a digital camera.

FIG. 3 is a conceptional drawing of the digital camera 100 for use in this invention. An image of a photographic object is converged and focused on the surface of the CCD 2 by the lens 1, and converted into an electrical signal. The converted electrical signal is further converted into digital image data by the subsequent A/D converter 3. The digital image data obtained by A/D conversion enters the subsequent signal processing circuit 4, where various kinds of signal processing are carried out.

The image data which have been subjected to signal processing are displayed on the image display means 5, or memorized in the image memorizing section 6. In this drawing, 20 is the main microcomputer, which controls mainly the sequence in photographing, recording, and reproducing, and executing data communication between the other apparatus (for example, a printing apparatus) and itself. 10 is the transmitting-and-receiving unit for executing data communication between an external apparatus and itself.

Numeral 8 is the release switch, and 9 is the print information input section for inputting various kinds of bits of print information (size, number of prints, etc.). 7 is the subordinate microcomputer, which is connected to the main microcomputer 20, controls man-machine interfaces such as switches for recording, reproducing, and frame progressing, and executes information transmitting to the main microcomputer as the occasion demands.

Figure 4:
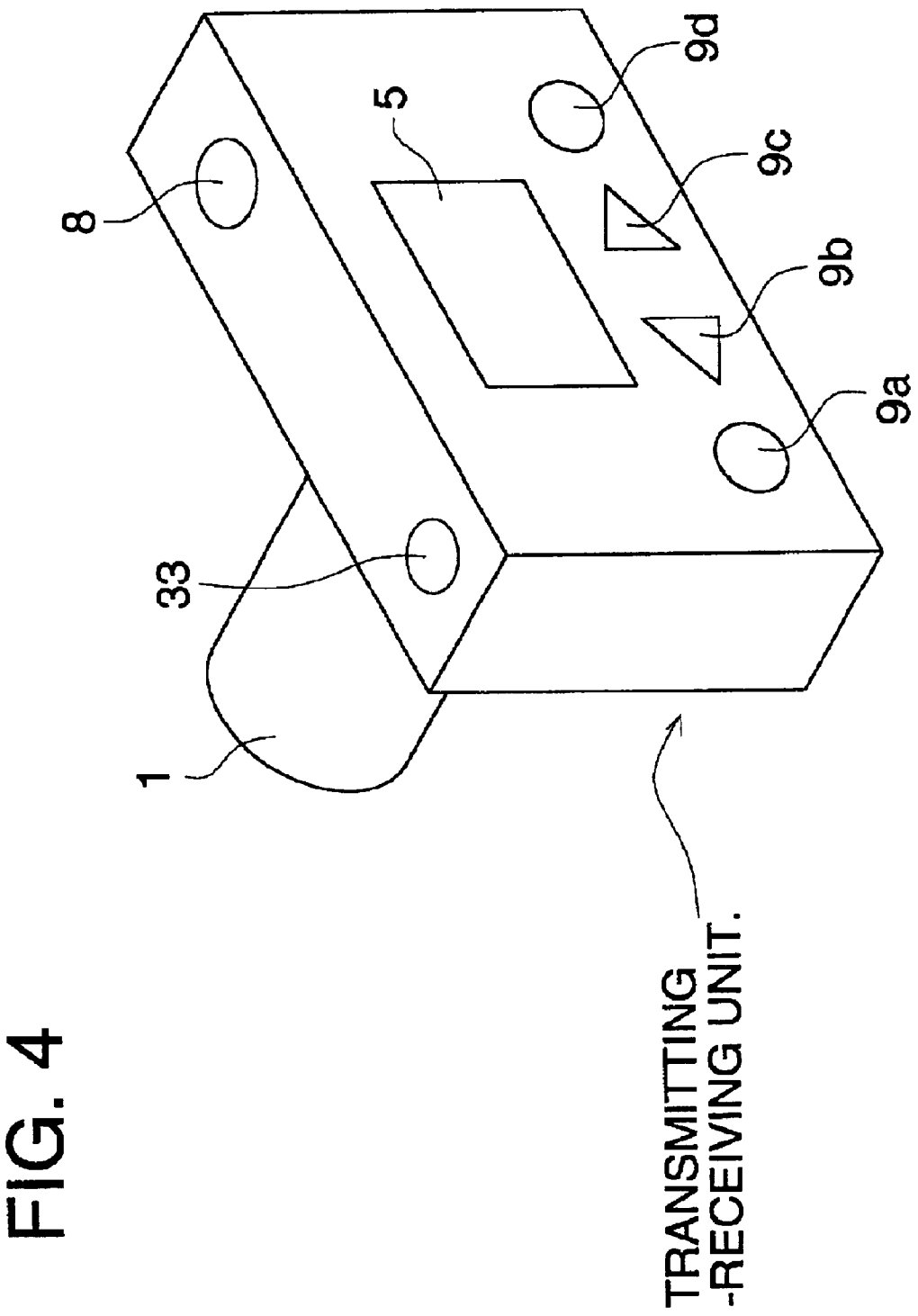
FIG. 4 is a drawing showing an example of the appearance structure of a digital camera.

FIG. 4 is a drawing showing an example of the appearance structure of the digital camera 100. The release switch 8 is disposed at the right side section on the upper surface, and the order button 33 is disposed at the left side section on the upper surface. Further, the image display section 8 such as an LCD is disposed on the rear surface to produce up a structure capable of displaying an image and various kinds of bits of information.

Further, under the image display section 5, the menu button 9a, the select buttons 9b and 9c, fixing button 9d etc., these functioning as the print information input section 9. Furthermore, on the front surface (not shown in the drawing), the transmitting-and-receiving section of the transmitting-and-receiving unit 10 is disposed. Moreover, the aforesaid digital camera 100 prepares order information using the menu button 9a, the select buttons 9b and 9c, and the fixing button 9d. The prepared order information is memorized in a memory means such as the image memorizing section 6.

The sending and receiving of information is carried out between the transmitting-and-receiving unit 10 and the transmitting-and-receiving unit 211 of the order counter 210. The explanation of the operation of the system having such a structure as described in the above is as follows:

(input mode of the relevant information)

An operator inputs the information relating to image data and print producing information in a manner such that they are in the state of correspondence with the identification information with reference to the display section 24. For example, the relevant information as described in the foregoing means the information such as the preference of the customer (for example, preference for a bluish color), hue, chroma, brightness, sharpness. In this way, the relevant information is memorized producing a pair with the identification information from the operation section 226.

(print producing mode)

When the transmitting-and-receiving unit 211 for receiving orders receives image data, print producing information, and identification information, it notifies this to the main microcomputer 222. When the main microcomputer 222 receives the image data and the print producing information which have been transmitted to it, it reads out the identification information in the memory section 225 corresponding to the identification information, which has been transmitted to it together with the above-mentioned information, and the relevant information 225a corresponding to the identification information.

When the relevant information is read out, the image data are printed in a color in accordance with the preference of the customer by the printer 223. For example, in the case where the customer prefers a bluish color, an image which has a color with a little bluish hue is printed. Further, in the case where the customer prefers a sharp image, an image with emphasized edges is printed.

In this way, according to the embodiment of this invention, in preparing a print on the basis of the image data and the print producing information, printing can be done utilizing the aforesaid relevant information.

In the above-described example of the embodiment, explanation is made for the operation in the case where image data and print producing information are transmitted to the system; however, this invention should not be limited to this example, and it may be appropriate that image data, print producing information, and identification information which have been transmitted beforehand are memorized in the memory section 225, and printing is made later by reading out these bits of information and utilizing relevant information.

In the example of the embodiment described in the above, it is taken for an example the case where a digital camera is used for the order apparatus; however, it may be possible to use any image processing apparatus which can send out image data, print producing information, and identification information.

As has been explained in detail up to now, according to this invention, in preparing a photographic print on the basis of image data and print producing information, printing can be carried out utilizing the aforesaid relevant information, by using a photographic print producing system which produces a photographic print on the basis of image data and print producing information transmitted to it comprising memory means for memorizing information relating to said image data and to said print producing information and a mode in which printing is done by utilizing said relevant information memorized in said memory means in producing a photographic print on the basis of said image data and said print producing information.

The relevant information memorized together with the identification information corresponding to the identification information which has been transmitted to the system can be read out and utilized, by using a photographic print producing system described in the above wherein the aforesaid relevant information is memorized in a memory means together with a identification information, and in the aforesaid mode, when the aforesaid image data and print producing information to be transmitted are transmitted together with the identification information, said relevant information which is corresponding to said identification information and memorized together with it is read out and utilized.

As described in the above, according to this invention, a photographic print producing system capable of carrying out printing in accordance with the preference of the customer can be provided.

What is claimed is:

1. A print producing system, comprising:

an operating device to input identification information of a customer, and relevant information which includes at least one of color, hue, chroma, brightness, sharpness, and hardness, all of which depend upon each customer, as preference of the customer about finishing of a color image print;

a memory device to memorize a paired data set of the relevant information paired with the identification information, inputted by the operating device so that the memory device memorizes a plurality of different paired data sets of plural different customers having respective different identification information;

an order receiving device to receive the identification information, color image data to be printed, and print producing information which contains at least one of print size and print quantity, from the customer;

a controller to obtain the relevant information of the customer from the plurality of different paired data sets memorized in the memory device, by using the identification information received by the order receiving device, wherein after the relevant information paired with the identification information for the customer has been already stored in the memory device, the controller obtains the relevant information be repeatedly using the same identification information of the customer for a next order; and a print producing device to produce the color image print, based on the color image data, the print producing information, and the relevant information.

2. The print producing system of claim 1, wherein the print producing device uses the same relevant information frequently, to produce the print of following orders placed by the customer having the same identification information.

3. The print producing system of claim 1, wherein the operating device rewrites the relevant information, based on the proposal of the customer having the same identification information.

4. The print producing system of claim 1, wherein the operating device changes the print producing information, based on the proposal of the customer.

5. The print producing system of claim 1, wherein the order receiving device further comprises a transmitting receiving unit which receives the identification information, the color image data to be printed, and the print producing information, through a network.

6. The print producing system of claim 1, wherein the order receiving device and the print producing device are connected through a network.

7. The print producing system of claim 6, wherein the order receiving device is located at a first site and the operating device, the controller and the print producing device are located at a second site.

* * * * *